United States Patent
Kashiwai et al.

(10) Patent No.: US 9,387,751 B2
(45) Date of Patent: Jul. 12, 2016

(54) ELECTRIC VEHICLE

(71) Applicant: HONDA MOTOR CO., LTD., Tokyo (JP)

(72) Inventors: Mikio Kashiwai, Wako (JP); Atsushi Kawaguchi, Wako (JP); Nobuo Kambara, Wako (JP); Shinya Agatsuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/533,351

(22) Filed: Nov. 5, 2014

(65) Prior Publication Data

US 2015/0122561 A1 May 7, 2015

(30) Foreign Application Priority Data

Nov. 7, 2013 (JP) ................................. 2013-231594

(51) Int. Cl.
*B60K 1/00* (2006.01)
*B60K 5/12* (2006.01)
*B62D 21/11* (2006.01)
*B60K 1/04* (2006.01)

(52) U.S. Cl.
CPC ... *B60K 1/00* (2013.01); *B60K 5/12* (2013.01); *B60K 5/1216* (2013.01); *B60K 2001/001* (2013.01); *B60K 2001/0422* (2013.01); *B62D 21/11* (2013.01)

(58) Field of Classification Search
CPC .. B60K 1/00; B60K 2001/001; B60K 7/0007; B60K 2007/0061; B60K 5/1216
See application file for complete search history.

(56) References Cited

U.S. PATENT DOCUMENTS

| | | | | |
|---|---|---|---|---|
| 5,718,407 A * | 2/1998 | Lee | ........................ | F16F 1/3842 180/312 |
| 5,740,876 A * | 4/1998 | Shimose | .............. | B60K 5/1216 180/232 |
| 6,116,587 A * | 9/2000 | Miyahara | ............. | B60K 5/1216 267/140.12 |
| 6,708,793 B2 * | 3/2004 | Witherspoon | ....... | B60K 5/1216 180/291 |
| 7,393,016 B2 * | 7/2008 | Mitsui | .................... | B62D 25/08 180/232 |
| 7,562,737 B2 * | 7/2009 | Miyahara | ............. | B60K 5/1208 180/291 |

(Continued)

FOREIGN PATENT DOCUMENTS

JP 2010-137805 A 6/2010

*Primary Examiner* — Emma K Frick
(74) *Attorney, Agent, or Firm* — Birch. Stewart, Kolasch & Birch, LLP

(57) ABSTRACT

A frame structure of an electric vehicle including right and left drive wheels is capable of being simplified while communalizing components and achieving an efficient arrangement of a running gear and electrical components. An electric vehicle includes a running gear including an electromotor and a speed reduction gear, and a running gear support frame provided to surround the running gear. The speed reduction gear is arranged in the right-to-left center of a vehicle body. The electromotor is configured in such a manner that an axis direction is arranged along a vehicle right-to-left direction so that the electromotor extends to one side in a right-to-left direction of the speed reduction gear and is arranged between the speed reduction gear and a left lower side frame of the running gear support frame.

13 Claims, 10 Drawing Sheets

(56) References Cited

U.S. PATENT DOCUMENTS

| | | | | |
|---|---|---|---|---|
| 7,874,395 B2* | 1/2011 | Taji | ............ | B60K 1/00 180/295 |
| 7,886,861 B2* | 2/2011 | Nozaki | ............ | B60K 1/00 180/232 |
| 8,479,868 B2* | 7/2013 | Wakatsuki | ............ | B60K 1/00 180/291 |
| 8,596,403 B2* | 12/2013 | Cunningham | ............ | B60K 1/00 180/291 |
| 8,651,216 B2* | 2/2014 | Wakatsuki | ............ | B62D 21/11 180/291 |
| 2012/0145467 A1* | 6/2012 | Wakatsuki | ............ | B60K 1/00 180/54.1 |
| 2012/0153718 A1* | 6/2012 | Rawlinson | ............ | H02K 5/20 307/10.1 |

\* cited by examiner

ELECTRIC VEHICLE

CROSS-REFERENCE TO RELATED APPLICATIONS

The present application claims priority under 35 USC 119 to Japanese Patent Application No. 2013-231594 filed Nov. 7, 2013 the entire contents of which are hereby incorporated by reference.

BACKGROUND OF THE INVENTION

1. Field of the Invention

The present invention relates to an electric vehicle.

2. Description of Background Art

In the existing electric vehicle with drive wheels driven by an electromotor, a running gear including the electromotor and a speed reduction gear are arranged in the right-to-left center of a vehicle body and drive shafts extending to the right and left drive wheels are made to have the same length. Thereby, components are communalized. See, for example, JP-A No. 2010-137805.

However, in the above-described related art, an axis direction of the electromotor is arranged along a vehicle longitudinal direction, and the electromotor is arranged in the right-to-left center of the vehicle body in order to extend forward from the speed reduction gear. For this reason, a frame for supporting the running gear has a complicated curved shape to surround a periphery of the electromotor in order to support the electromotor. Thus, it is desirable to simplify a frame structure.

Also, it is conceivable that, in order to arrange the speed reduction gear in the right-to-left center of the vehicle body and to easily transmit power from the electromotor to the drive shafts, the axis direction of the electromotor is arranged along the vehicle right-to-left direction. It is also desirable to compactly mount the running gear (the electromotor and the speed reduction gear) to the vehicle body in a narrow space.

SUMMARY AND OBJECTS OF THE INVENTION

Therefore, an object of an embodiment of the present invention is to simplify a frame structure while communalizing components and to achieve a compact arrangement of a running gear, in an electric vehicle including right and left drive wheels.

As a solution to the above-described problem, according to an embodiment of the present invention, an electric vehicle (1) is provided with a pair of right and left drive wheels (RW) that are driven by an electromotor (13). The electric vehicle (1) includes a running gear (12) including the electromotor (13) and a speed reduction gear (14), and a running gear support frame (35) provided to surround the running gear (12). The speed reduction gear (14) is configured to decelerate power from the electromotor (13) and to transmit the power to the pair of right and left drive wheels (RW) through a pair of right and left drive shafts (15), and is arranged in the right-to-left center of a vehicle body in order to make the pair of right and left drive shafts (15) have the same length. The electromotor (13) is configured in such a manner that an axis direction is arranged along a vehicle right-to-left direction in order to extend the electromotor (13) on one side in a right-to-left direction of the speed reduction gear (14), and is arranged between the speed reduction gear (14) and frame members (27) of the running gear support frame (35).

According to an embodiment of the present invention, the running gear support frame (35) has a pair of right and left side frames (27), and front and rear cross frames (18, 30). The running gear (12) is configured in such a manner that a front end (56b) and a rear end (56c) of the speed reduction gear (14) are respectively supported on the front and rear cross frames (18, 30), and a side end (55b) on a side of the electromotor (13) is supported on the side frame (27) located on the same side as the electromotor (13).

According to an embodiment of the present invention, the side end (55b) is supported on the side frame (27) through a motor support bracket (61), and the motor support bracket (61) supports the side end (55b) on an outer side of the side frame (27).

According to an embodiment of the present invention, the motor support bracket (61) includes a frame-side bracket (63) fixed to the side frame (27), a motor-side bracket (62) fixed to the side end (55b), and a damper member (64) arranged between the frame-side bracket (63) and the motor-side bracket (62).

According to an embodiment of the present invention, the frame-side bracket (63) supports a periphery of the cylindrical damper member (64), and the motor-side bracket (62) supports a core member (62d) inserted into an inner side of the damper member (64).

According to an embodiment of the present invention, the front end (56b) of the speed reduction gear (14) is supported on the front cross frame (18) through a speed reduction gear front support bracket (66), the rear end (56c) of the speed reduction gear (14) is supported on the rear cross frame (30) through a speed reduction gear rear support bracket (71), and the speed reduction gear front support bracket (66) and the speed reduction gear rear support bracket (71) respectively support the front end (56b) and the rear end (56c) of the speed reduction gear (14) on an inner side of the running gear support frame (35).

According to an embodiment of the present invention, the speed reduction gear front support bracket (66) includes a speed reduction gear front bracket (67) fixed to the front end (56b) of the speed reduction gear (14), a frame front bracket (68) fixed to the front cross frame (18), and a front damper member (69) arranged between the speed reduction gear front bracket (67) and the frame front bracket (68). The speed reduction gear rear support bracket (71) includes a speed reduction gear rear bracket (72) fixed to the rear end (56c) of the speed reduction gear (14), a frame rear bracket (73) fixed to the rear cross frame (30), and a rear damper member (74) arranged between the speed reduction gear rear bracket (72) and the frame rear bracket (73).

According to an embodiment of the present invention, the frame front bracket (68) and the frame rear bracket (73) respectively support a periphery of the cylindrical front damper member (69) and a periphery of the cylindrical rear damper member (74). The speed reduction gear front bracket (67) and the speed reduction gear rear bracket (72) respectively support core members (67d, 72d) that are inserted into an inner side of the front damper member (69) and an inner side of the rear damper member (74).

According to an embodiment of the present invention, the side end (55b) of the running gear (12) is supported on the side frame (27) through the motor support bracket (61). The motor support bracket (61) includes the frame-side bracket (63) fixed to the side frame (27), the motor-side bracket (62) fixed to the side end (55b), and the damper member (64) arranged between the frame-side bracket (63) and the motor-side bracket (62). The frame-side bracket (63) supports the periphery of the cylindrical damper member (64). The motor-side bracket (62) supports the core member (62d) inserted into the inner side of the damper member (64). The respective core members (67d, 72d) of the speed reduction gear front support bracket (66) and the speed reduction gear rear support bracket (71) and the core member (62d) of the motor support bracket (61) are arranged in such a manner that respective axial directions are perpendicular to each other.

According to an embodiment of the present invention, a pair of right and left suspension arms (42) is provided for supporting the pair of right and left drive wheels (RW). The pair of right and left side frames (27) is provided with front and rear arm support portions that respectively swingably support the pair of right and left suspension arms (42). The motor support bracket (61) is positioned between the front and rear arm support portions, and is arranged in a space surrounded by the suspension arm (42) and the side frame (27).

According to an embodiment of the present invention, the pair of right and left drive wheels (RW) is supported by double wishbone suspensions (40). The pair of right and left side frames (27) swingably supports the pair of right and left suspension arms (42) of the suspensions (40). The running gear support frame (35) is provided with a pair of right and left upper side frames (28) that are arranged above the pair of right and left side frames (27). The pair of right and left upper side frames (28) swingably supports a pair of right and left upper arms (41) of the suspensions (40). An electrical component (102, 103, 101, 107) that allows driving of the electromotor (13) is arranged between the pair of right and left upper side frames (28).

According to an embodiment of the present invention, an inverter (102a) controlling the driving of the electromotor (13) is arranged on a side opposite to the electromotor (13) in the vehicle right-to-left direction.

According to an embodiment of the present invention, the electromotor is configured in such a manner that the axis direction is arranged along the vehicle right-to-left direction, and the electromotor is arranged between the speed reduction gear positioned in the right-to-left center of the vehicle body and the frame member of the running gear support frame. For this reason, the electromotor can be surrounded and supported without forming the running gear support frame into a complicated curved shape. More specifically, the frame structure can be simplified while communalizing the right and left drive shafts.

According to an embodiment of the present invention, the running gear is configured in such a manner that the front end and the rear end of the speed reduction gear positioned in the right-to-left center of the vehicle body are supported, and also the side end of the running gear on the side of the electromotor positioned on one side in the right-to-left direction is supported. For this reason, the running gear can be stably supported on the running gear support frame at least at three points avoiding the same straight line.

According to an embodiment of the present invention, the motor support bracket supports the side end on the side of the electromotor on the outer side of the side frame. For this reason, it is not necessary to provide an arrangement space for the motor support bracket between the side frame and the side end, such a compact layout that the electromotor is brought closest to the side frame can be achieved, and support in the narrow space can be achieved.

According to an embodiment of the present invention, the frame-side bracket and the motor-side bracket are connected to each other through the damper member. For this reason, the side end on the side of the electromotor is supported on the side frame through the damper member, and transmission of vibration or the like of the running gear to the running gear support frame can be suppressed.

According to an embodiment of the present invention, the frame-side bracket and the motor-side bracket respectively support the periphery and the inner side of the damper member. For this reason, the vibration of the running gear in multiple directions can be successfully damped by the damper member.

According to an embodiment of the present invention, the front end and the rear end of the speed reduction gear are supported on the inner side of the running gear support frame by the speed reduction gear front support bracket and the speed reduction gear rear support bracket. For this reason, the speed reduction gear can be arranged in the running gear support frame.

According to an embodiment of the present invention, the frame front bracket and the frame rear bracket, and the speed reduction gear front bracket and the speed reduction gear rear bracket, are respectively connected to each other through the front damper member and the rear damper member. For this reason, transmission of the vibration or the like of the running gear to the running gear support frame can be suppressed.

According to an embodiment of the present invention, the frame front bracket and the frame rear bracket, and the speed reduction gear front bracket and the speed reduction gear rear bracket, respectively support the peripheries and the inner sides of the front damper member and the rear damper member. For this reason, the vibration of the running gear in the multiple directions can be successfully damped by the front damper member and the rear damper member.

According to an embodiment of the present invention, the respectively core members of the speed reduction gear front support bracket and the speed reduction gear rear support bracket, and the core member of the motor support bracket, are arranged in such a manner that the respective axial directions are perpendicular to each other. For this reason, the vibration of the running gear in the multiple directions can be more successfully damped.

According to an embodiment of the present invention, the motor support bracket is positioned between the front and rear arm support portions, and is arranged in the space surrounded by the suspension arm and the side frame. For this reason, the space formed inside of the suspension arm can be made to serve as an arrangement space for the motor support bracket, and efficient component arrangement can be achieved.

According to an embodiment of the present invention, the upper arms and the lower arms are swingably supported on the right and left side frames and the right and left upper side frames of the running gear support frame, and also the running gear and the electrical components are supported inside of the box-shaped running gear support frame. For this reason, a supporting structure for the running gear and the suspensions can be collected to the running gear support frame, and efficient assembly can be achieved.

According to an embodiment of the present invention, the comparatively large-size inverter is arranged on the side opposite to the electromotor in the vehicle right-to-left direction. For this reason, the component arrangement that is well balanced in weight can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
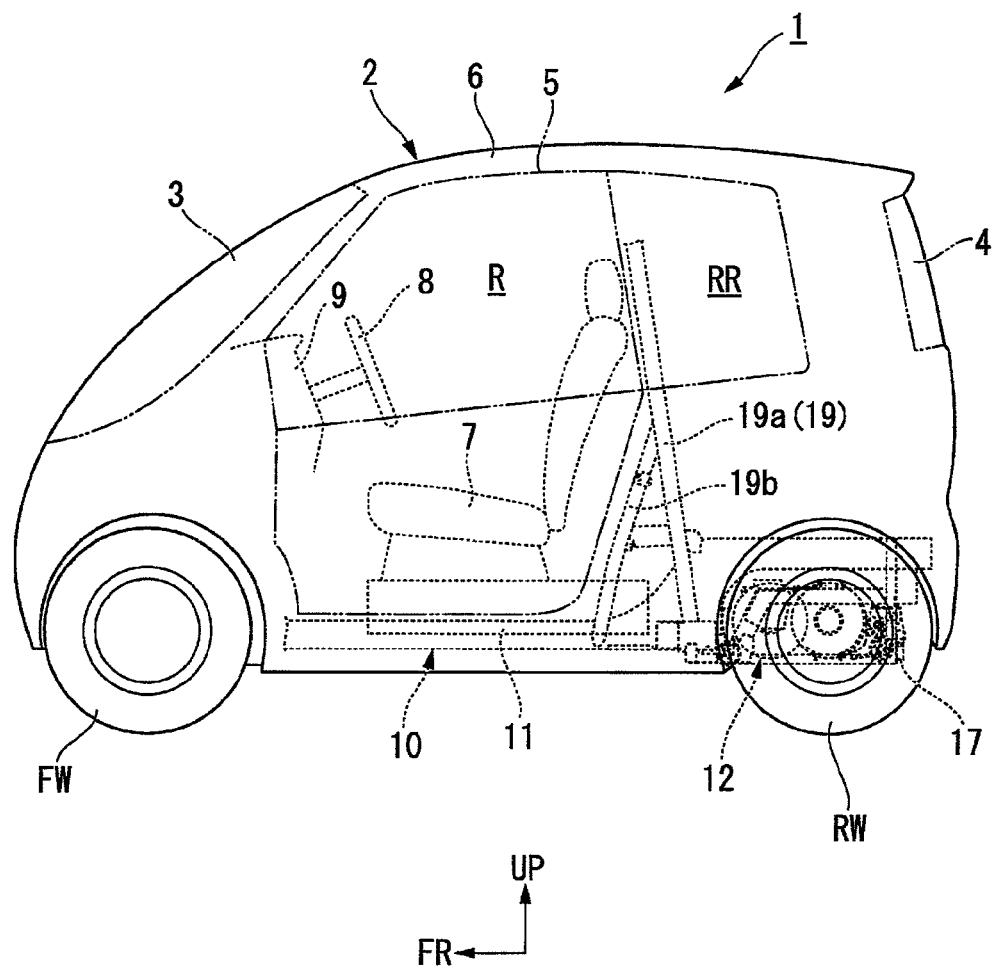
FIG. 1 is a left side view of an electric vehicle according to an embodiment of the present invention.

An embodiment of the present invention will be described below with reference to drawings. Note that in the following description, directions such as front and rear, and right and left are the same directions as those in a vehicle which will be described below unless otherwise stated. Also, note that in right places in the drawings used for the following description, arrows are shown. An arrow FR is indicative of a front side of the vehicle, an arrow LH is indicative of a left side of the vehicle, and an arrow UP is indicative of an upper side of the vehicle. Also, a line CL in the drawings is indicative of a right-to-left centerline of a vehicle body.

The electric vehicle 1 shown in FIG. 1 is a comparatively compact MUV (Multi-Utility Vehicle), and includes a pair of right and left front wheels FW as steered wheels that are provided on both sides of a front side of the vehicle body, and a pair of right and left rear wheels RW as drive wheels that are provided on both sides of the rear side of the vehicle body.

The electric vehicle 1 has an upper body 2 defining a riding space R. The upper body 2 includes a windshield 3 and a rear window glass 4 that are provided forward and rearward of the riding space R, doors 5 for covering both sides of the riding space R, a roof 6 for covering an upper side of the riding space R, and the like. Except for glasses for window portions, the upper body 2 has a part formed of a steel plate or synthetic resin.

A driver seat 7 having a seat body and a backrest is arranged, for example, in the right-to-left center of the riding space R. A steering wheel 8 and a dashboard 9 are arranged in a front portion of the riding space R and forward of the seat 7. A rear space RR as a luggage compartment or a rear riding space is formed in a rear portion of the riding space R and behind the seat 7.

The upper body 2 is mounted on a lower vehicle body frame (simply called a vehicle body frame hereafter) forming a vehicle body lower portion. A traveling main battery 11 supported on the vehicle body frame 10 is arranged below the seat 7. A traveling running gear 12 mounted in the rear of the vehicle body frame 10 is arranged behind the main battery 11.

Figure 2:
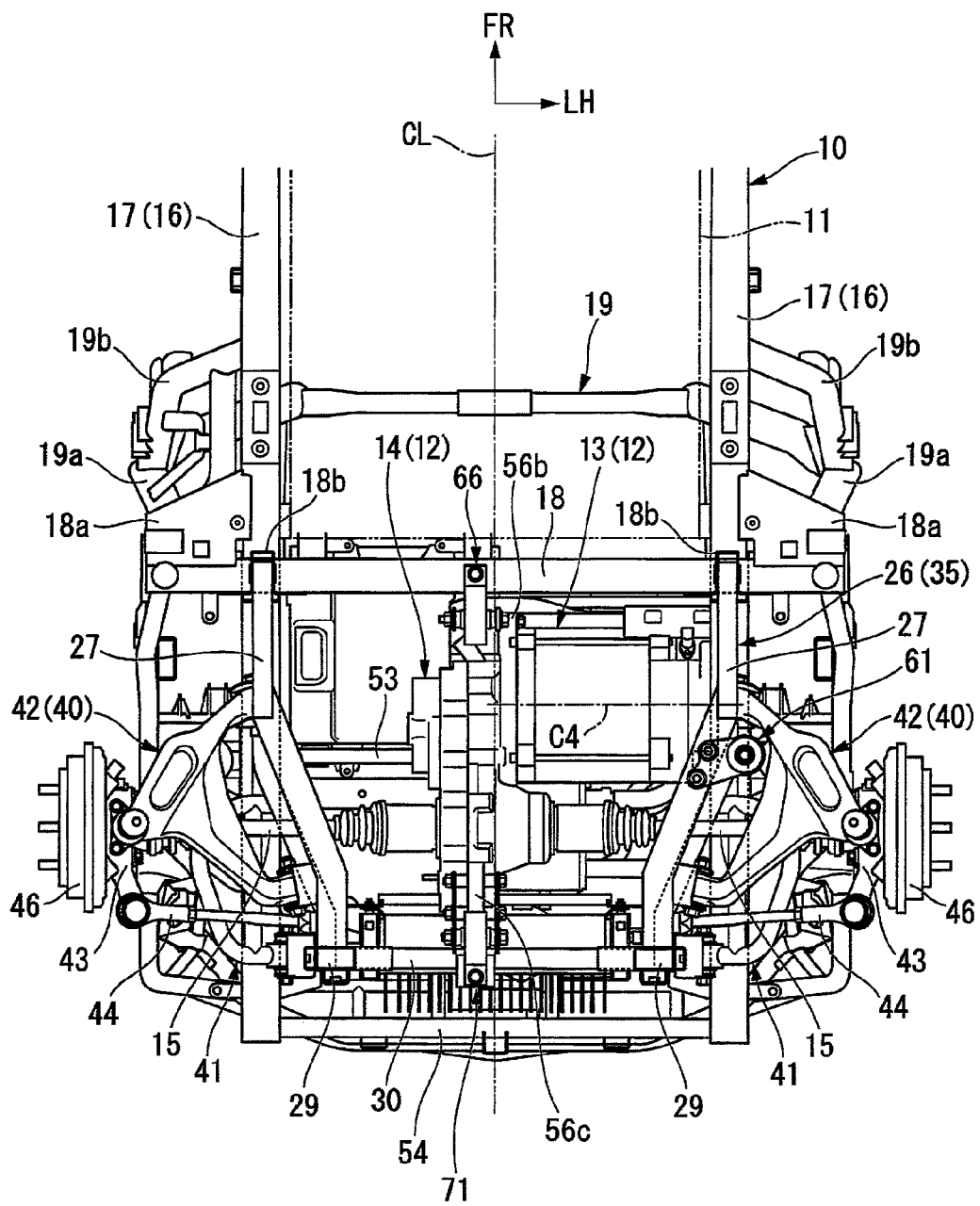
FIG. 2 is a bottom view of a rear portion of a lower vehicle body frame of the electric vehicle.

As illustrated in FIG. 2, the running gear 12 is provided with an electromotor 13 driven by electric power supplied from the main battery 11, and a speed reduction gear 14 that decelerates driving force of the electromotor 13 and that appropriately distributes the driving force to the right and left rear wheels RW. Drive shafts 15 extend from the speed reduction gear 14 of the running gear 12 toward the right and left rear wheels RW. The driving force of the electromotor 13 is transmitted to the right and left rear wheels RW through the speed reduction gear 14 and the right and left drive shafts 15.

Figure 5:
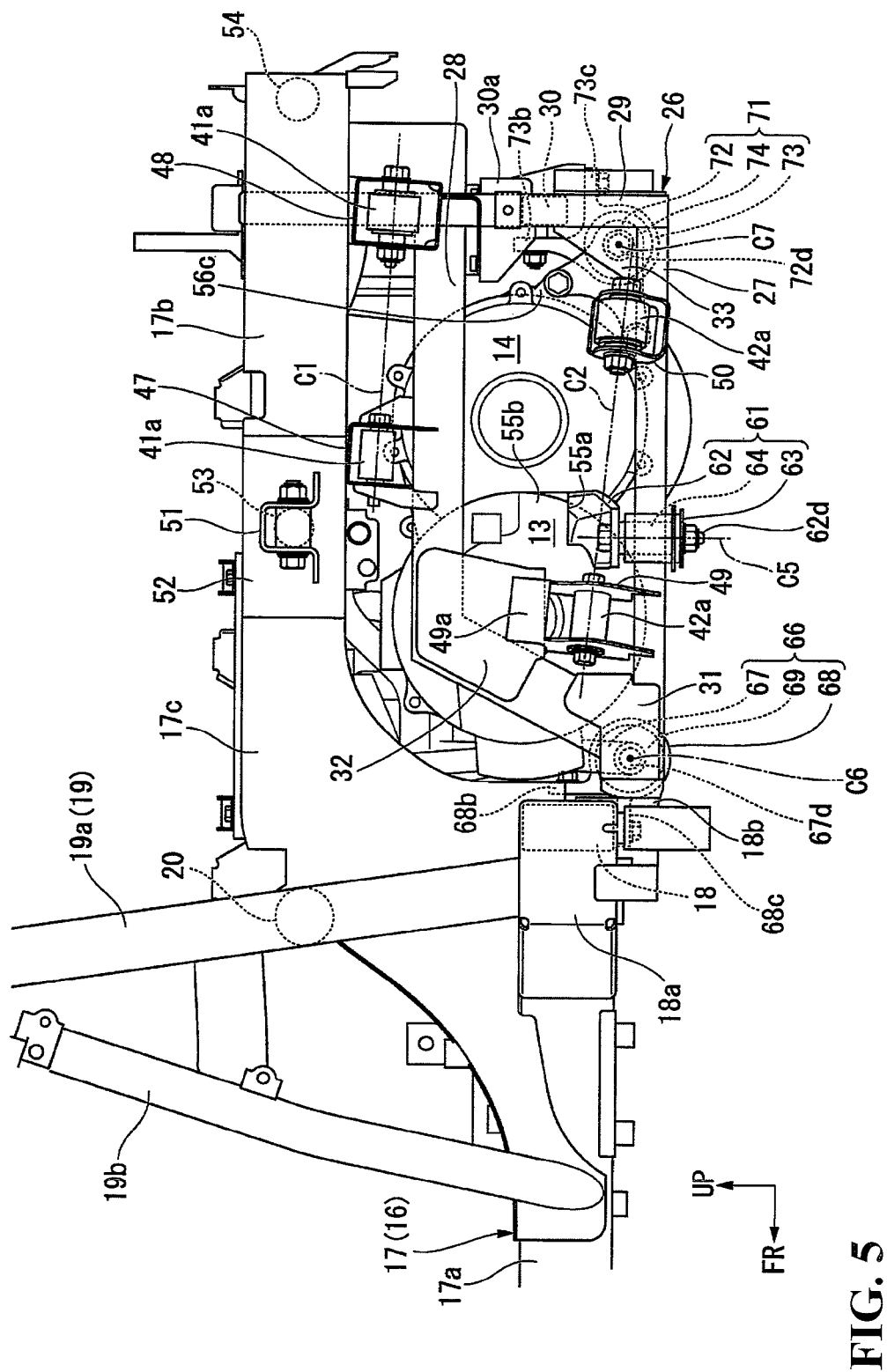
FIG. 5 is a left side view of the periphery of the running gear.

As shown in FIG. 2 and FIG. 5, the vehicle body frame 10 is formed in such a manner that a separate sub-frame 26 is integrally coupled to a rear portion of a frame body 16 including a pair of right and left side frames 17 by bolts or the like.

The frame body 16 is formed in such a manner that a plurality of kinds of square steel pipes are integrally joined to each other by welding or the like, and the right and left side frames 17 of the frame body 16 extend in a longitudinal direction on an inner side in a vehicle width direction (right-to-left direction) in comparison with side sills of the upper body 2. The right and left side frames 17 have center portions 17a that are arranged in parallel to each other on the inner side in the vehicle width direction of the right and left side sills and that extend in the longitudinal direction, rear portions 17b that are arranged below the rear space RR positioned behind the center portions 17a, that are displaced upward beyond the center portions 17a, and that extend in the longitudinal direction, and stepped portions 17c that connect rear ends of the center portions 17a and front ends of the rear portions 17b. The right and left side frames 17 linearly extend in a top view without changing positions in the right-to-left direction. The main battery 11 arranged along a floor surface in the riding space R is supported between the center portions 17a of the right and left side frames 17.

A rear lower cross frame 18 having a rectangular cross section and extending from side to side is laid between lower back ends of the stepped portions 17c of the right and left side frames 17. Right and left ends of the rear lower cross frame 18 project outward in the right-to-left direction in comparison with the outer surfaces of the stepped portions 17c, and a pair of right and left gussets 18a is fixed in order to stride front surfaces of projecting portions and the outer surfaces of the stepped portions 17c. Lower ends of right and left raised portions 19a of a roll bar 19 are respectively fixed to the upper surfaces of the right and left gussets 18a. A pair of right and left support members 19b as part of the roll bar 19 is laid between upper and lower intermediate portions of the right and left raised portions 19a and the rear ends of the right and left center portions 17a.

A rear upper cross frame 20 having a circular cross section and extending from side to side is laid between upper front ends of the right and left stepped portions 17c. Right and left ends of the rear upper cross frame 20 project outward in the right-to-left direction in comparison with the outer surfaces of the stepped portions 17c, and tips of the right and left ends are joined to lower inner sides of the right and left raised portions 19a of the roll bar 19.

The upper body 2 including the roll bar 19 is mounted on the vehicle body frame 10 (frame body 16) and integrally connected thereto. Note that a monocoque structure with the upper body 2 and the vehicle body frame 10 integrated with each other may be employed.

As shown in FIG. 3 to FIG. 8, the sub-frame 26 is formed in such a manner that the plurality of kinds of square steel pipes are integrally joined to each other by welding or the like, and has a pair of right and left lower side frames 27 that are located in the height of the lower ends of the rear lower cross frame 18 and that extend substantially horizontally behind the rear lower cross frame 18, a pair of right and left upper side frames 28 that extend in an upward rear direction from the front ends of the right and left lower side frames 27, that are subsequently curved rearward, and that extend substantially horizontally, a pair of right and left rear end frames 29 that is laid over the rear ends of the right and left lower side frames 27 and the rear ends of the right and left upper side frames 28 and that extend in a vertical direction, and a rear end cross frame 39 that is laid between lower portions 29a of the right and left rear end frames 29 and that extend from side to side.

The right and left lower side frames 27 and the right and left upper side frames 28 form substantially portal right and left structures opened rearward in the side view, and opened sides of the right and left structures are integrally coupled to each other by the right and left rear end frames 29 and the rear end cross frame 30 that are joined to each other in a substantially H shape in a rear view. With this arrangement, the sub-frame 26 forms a box structure as a whole, and the running gear 12 can be mounted inside thereof.

In the drawings, each of first gussets 31 extend over the front ends of the lower side frames 27 and the front ends of the upper side frames 28, each of second gussets 32 extend over parts in front and rear of curved portions in the side view of the upper front sides of the upper side frames 28, each of third gussets 33 extend over the rear ends of the lower side frames 27 and the lower ends of the rear end frames 29, and each of fourth gussets 34 extend over the lower ends of the rear end frames 29 and the end of the rear end cross frame 30.

The lower side frames 27 are provided in such a manner that the front portions 27a thereof extend in the longitudinal direction in the same positions in the right-to-left direction as the side frames 17 of the frame body 16. The rear portions 27b of the lower side frames 27 are provided to extend in the longitudinal direction on the inner side in the vehicle width direction in comparison with the front portions 27a. Intermediate portions 27c between the front portions 27a and the rear portions 27b are obliquely provided in the bottom view so as to be positioned on the inner side in the vehicle width direction toward the rear sides.

The upper side frames 28 are provided in such a manner that the front portions 28a from the front ends of the upper side frames 28 to the intermediate positions of the parts behind the curved portions in the side view are arranged in the same position in the right-to-left direction as the side frames 17 of the frame body 16 and extend in the longitudinal direction in the bottom view. The rear portions of the upper side frames 28 are provided to extend in the longitudinal direction on the inner side in the vehicle width direction in comparison with the front portions 28a. The intermediate portions 28c between the front portions 28a and the rear portions 28b are obliquely provided in the bottom view so as to be positioned on the inner side in the vehicle width direction toward the rear sides.

The intermediate portions 28c of the upper side frames 28 are arranged substantially in parallel to the intermediate portions 27c of the lower side frames 27, and are arranged behind the intermediate portions 27c of the lower side frames 27. The rear portions 28b of the upper side frames 28 have shorter longitudinal length than the rear portions 27b of the lower side frames 27.

Solid coupling bodies 27d are integrally joined to the front ends of the lower side frames 27. A pair of right and left lower coupling brackets 18b is fixed to the lower sides of the rear lower cross frame 18 of the frame body 16, the lower sides being positioned in the same right-to-left direction as the right and left side frames 17. The right and left lower coupling brackets 18b have right and left sidewalls opposed to each other. With the coupling bodies 27d of the right and left lower side frames 27 entered into the inner sides of the right and left sidewalls, the right and left lower coupling brackets 18b and the coupling bodies 27d are integrally coupled to each other by bolts or the like arranged along the right-to-left direction with respect to each of right and left sides.

The rear end frames 29 are obliquely arranged in such a manner that the upper sides of the lower portions 29a are positioned outward in the right-to-left direction with respect to the lower portions 29a arranged along the vertical direction. A pair of right and left upper coupling brackets 17d is fixed to the right and left inner sides behind the rear portions 17b of the side frames 17 of the frame body 16. The right and left upper coupling brackets 17d have front and rear walls opposed to each other. With the upper ends of the right and left rear end frames 29 entered into the inner sides of the front and rear walls, the right and left upper coupling brackets 17d and the right and left rear end frames 29 are integrally coupled to each other by bolts or the like arranged along the longitudinal direction with respect to each of the right and left sides.

By the above-described coupling, the sub-frame 26 is fixedly coupled to the rear portion of the frame body 16, and the integrated vehicle body frame 10 is formed. Note that a collar or the like is appropriately buried in a fastening portion of a hollow frame member.

The right and left front wheels FW are suspended in front of the vehicle body frame 10 through independent suspension type (double wishbone type) front suspensions (not shown). Similarly, the right and left wheels RW are suspended in the rear of the vehicle body frame 10 (the rear portion of the frame body 16 and the sub-frame 16) through independent suspension type (double wishbone type) rear suspensions 40.

The rear suspensions 40 have upper arms 41 with base ends 41a swingably supported on the upper side frames 28 of the sub-frame 26 and sides of tip ends extending outward in the vehicle width direction, lower arms 42 with base ends 42a swingably supported on the lower side frames 27 of the sub-frame 26 and sides of tip ends extending outward in the vehicle width direction, knuckles 43 with upper and lower ends swingably supported at tip ends 41b of the upper arms 41 and tip ends 42b of the lower arms 42, control rods 44 laid between rear arms 43a of the knuckles 43 and the third gussets 33 of the sub-frame 26, and cushion units 45 interposed between the lower arms 42 and the rear portions 17b of the side frame 17 of the frame body 16. Hubs 46 of the rear wheels RW are rotatably journaled to the knuckles 43. A pair of right and left elements of the rear suspensions 40 is provided corresponding to the right and left rear wheels RW.

Each of the upper arms 41 is formed into a substantially A shape having base ends 41a located in two positions in the longitudinal direction and a tip end 41b located in one position. Similarly, each of the lower arms 42 is formed into the substantially A shape having base ends 42a located in two positions in the longitudinal direction and a tip end 42b located in one position. The upper arms 41 are formed in such a manner that, for example, circular steel pipes are integrally joined to each other by welding or the like, and the lower arms 42 are integrally formed, for example, by aluminum die casting or the like.

A pair of right and left upper front support brackets 47 is fixed to the upper sides of the intermediate portions 28c of the right and left upper side frames 28 of the sub-frame 26. The right and left upper front support brackets 47 have front and rear walls opposed to each other. With the front base ends 41a of the right and left upper arms 41 entered into the inner sides of the front and rear walls, the right and left upper front support brackets 47 and the front base ends 41a are relatively rotatably coupled to each other by bolts or the like arranged along the longitudinal direction with respect to each of the right and left sides.

A pair of right and left upper rear support brackets 48 is fixed to the right and left outer sides of the upper portions 29b of the right and left rear end frames 29 of the sub-frame 26 while extending over also the upper side frames 28. The right and left upper rear support brackets 48 have front and rear walls opposed to each other. With the rear base ends 41a of the right and left upper arms 41 entered into the inner sides of the front and rear walls, the right and left upper rear support brackets 48 and the rear base ends 41a are relatively rotatably coupled to each other by bolts or the like arranged along the longitudinal direction with respect to each of the right and left sides and also arranged coaxially with the above-described bolts.

The right and left upper arms 41 are swingably supported by the upper portion of the sub-frame 26 around axes C1 shared by the respective bolts. In the bottom view, the axes C1 are basically arranged along the longitudinal direction; however, in the side view, the axes C1 are inclined rearwardly and downwardly.

A pair of right and left lower front support brackets 49 is fixed to the upper sides of the curved portions in a planar view on the front sides of the intermediate portions 27c of the right and left lower side frames 27 of the sub-frame 26. The right and left lower front support brackets 49 have front and rear walls opposed to each other. With the front base ends 42a of the right and left lower arms 42 entered into the inner sides of the front and rear walls, the right and left lower front support brackets 49 and the front base ends 42a are relatively rotatably coupled to each other by bolts or the like extending in the longitudinal direction with respect to each of the right and left sides. Upper joint portions 49a respectively joined to the upper second gussets 32 are provided to the upper portions of the right and left lower front support brackets 49.

A pair of right and left lower rear support brackets 50 is fixed to the upper outer sides of the curved portions in the planar view on the rear sides of the intermediate portions 27c of the right and left lower side frames 27 of the sub-frame 26. The right and left lower rear support brackets 50 have front and rear walls opposed to each other. With the rear base ends 42a of the right and left lower arms 42 entered into the inner sides of the front and rear walls, the right and left lower rear support brackets 50 and the rear base ends 42a are relatively rotatably coupled to each other by bolts or the like extending in the longitudinal direction with respect to each of the right and left sides and also arranged coaxially with the above-described bolts.

The right and left lower arms 42 are swingably supported by the lower portion of the sub-frame 26 around axes C2 shared by the respective bolts. The lower rear support brackets 50 and the rear base ends 42a of the lower arms 42 are positioned on the inner side in the right-to-left direction in comparison with the lower front support brackets 49 and the front base ends 42a of the lower arms 42. In the bottom view, the axes C2 are inclined to be positioned on the inner side in the right-to-left direction toward the rear side. In the side view, the axes C2 are inclined rearwardly and downwardly in the same way as the axes C1 of the upper arms 41.

Figure 4:
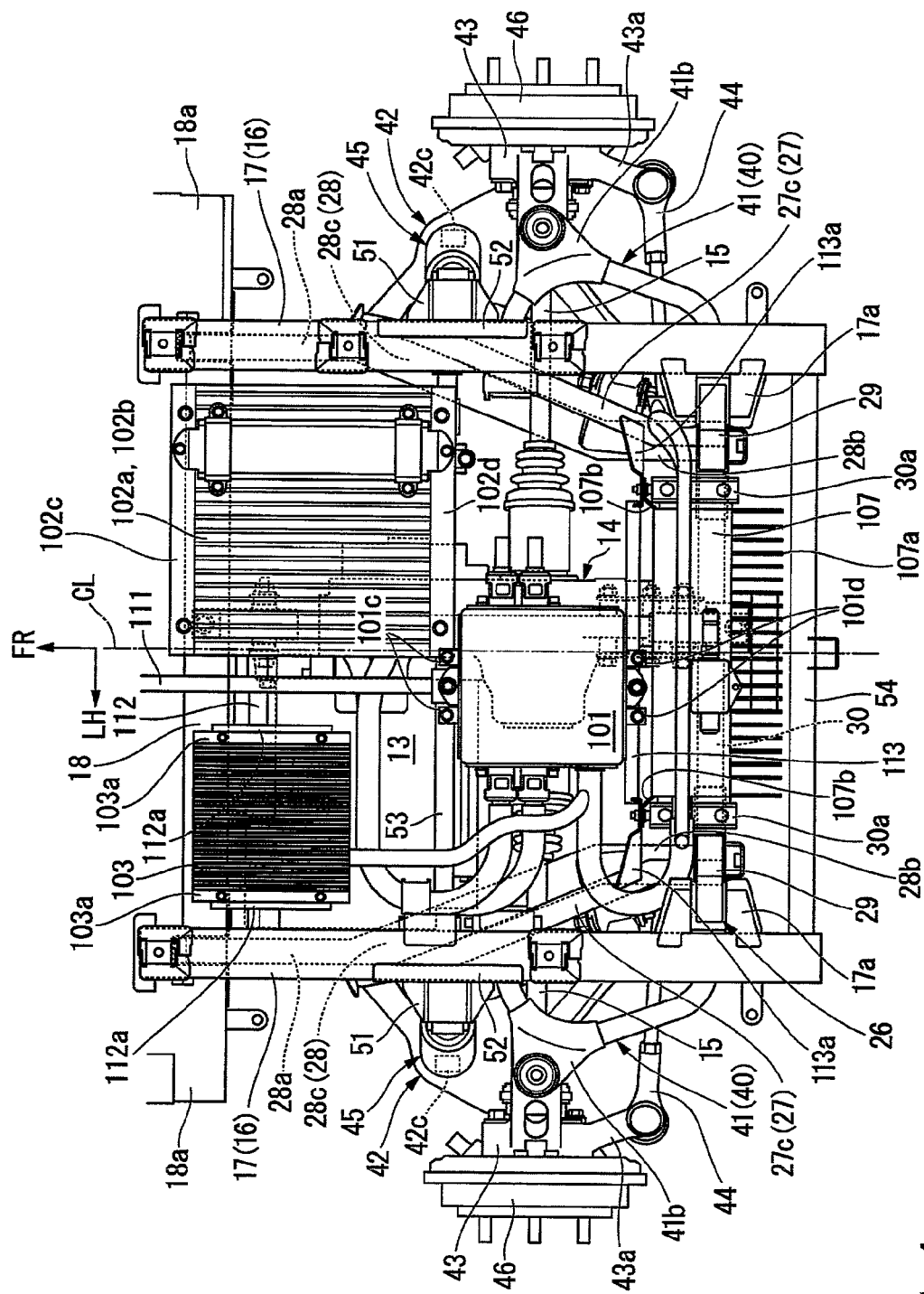
FIG. 4 is a top view of the periphery of the running gear.

Shock absorber lower coupling portions 42c respectively project from the front upper sides of the right and left lower arms 42 (see FIG. 4). The lower ends of the right and left shock absorber units 45 are relatively rotatably coupled to the right and left shock absorber lower coupling portions 42c through bolts or the like arranged along the longitudinal direction.

The shock absorber units 45 are the well-known shock absorber units having rod type dampers and coil springs wound around the rod type dampers. The shock absorber units 45 perform strokes along central axes (stroke axes) thereof in order to be elongated and contracted, thereby obtaining a predetermined buffer action. In the side view, the shock absorber units 45 are arranged in such a manner that the stroke axes are arranged along substantially the vertical direction, and in the rear view, the shock absorber units 45 are obliquely arranged so that the stroke axes are positioned inside in the right-to-left direction toward the upper sides. The upper ends of the cushion units 45 are relatively rotatably coupled to a pair of right and left shock absorber upper coupling brackets 51 fixed to the outer sides of the rear portions 17b of the right and left side frames 17 of the frame body 16 through bolts or the like arranged along the longitudinal direction.

A pair of right and left reinforcing plates 52 that respectively cover a wider range than the shock absorber upper coupling brackets 51 in the side view is mounted to portions with the shock absorber upper coupling brackets 51 mounted, the shock absorber upper coupling brackets 51 being located on the outer surfaces of the rear portions 17b of the right and left side frames 17. A rear upper center cross frame 53 extending from side to side so as to be laid between the right and left shock absorber upper coupling brackets 51 is laid between the rear portions 17b of the right and left side frames 17. Rear upper end cross frames 54 extending from side to side are laid between the rear ends of the rear portions 17b of the right and left side frames 17.

The running gear 12 integrally has the electromotor 13 configured in such a manner that a drive axis (motor axis) C4 is arranged in the right-to-left direction on the left side of the lower portion of the rear portion of the vehicle body, and the speed reduction gear 14 that is connected with a right end of the electromotor 13 in the right-to-left center of the rear portion of the vehicle body and that extends rearward of the electromotor 13.

The electromotor 13 is subjected to variable speed drive performed by, for example, VVVF (Variable Voltage Variable Frequency) control. The electromotor is subjected to transmission control as if the electromotor includes a continuously variable transmission; however, it is not limited thereto. The electromotor may be subjected to shift control as if the electromotor includes the existing automatic transmission.

The electromotor 13 has a cylindrical housing 55 with the motor axis C4 as the center. A right end of the housing 55 is connected to and supported by a motor holder 56a on a left side of a front portion of a casing 56 for the speed reduction gear 14. A left end of the housing 55 (the side end 55b of the running gear 12 on a side of the electromotor 13) is supported by the intermediate portion 27c of the left lower side frame 27 of the sub-frame 26 through a motor support bracket 61 which will be detailedly described later.

The speed reduction gear 14 decelerates the driving force of the electromotor 13 by a gear train or the like stored throughout a front side to a rear side in the housing 55, and also appropriately distributes the driving force transmitted to the right and left drive shafts 15 and the right and left rear wheels RW by a differential mechanism stored in a rear portion of the housing 55. The speed reduction gear 14 is arranged astride a right-to-left centerline CL of the vehicle body in the right-to-left direction in the bottom view so that the right and left drive shafts 15 are made to serve as common components.

A front end 56b of the speed reduction gear 14 below the housing 55 is supported by the right-to-left intermediate portion of the rear lower cross frame 18 of the frame body 16 through a speed reduction gear front support bracket 66 which will be detailedly described later. A rear end 56c of the speed reduction gear 14 below the housing 55 is supported by the right-to-left intermediate portion of the rear end cross frame 30 of the sub-frame 26 through a speed reduction gear rear support bracket 71 which will be detailedly described later.

Figure 9:
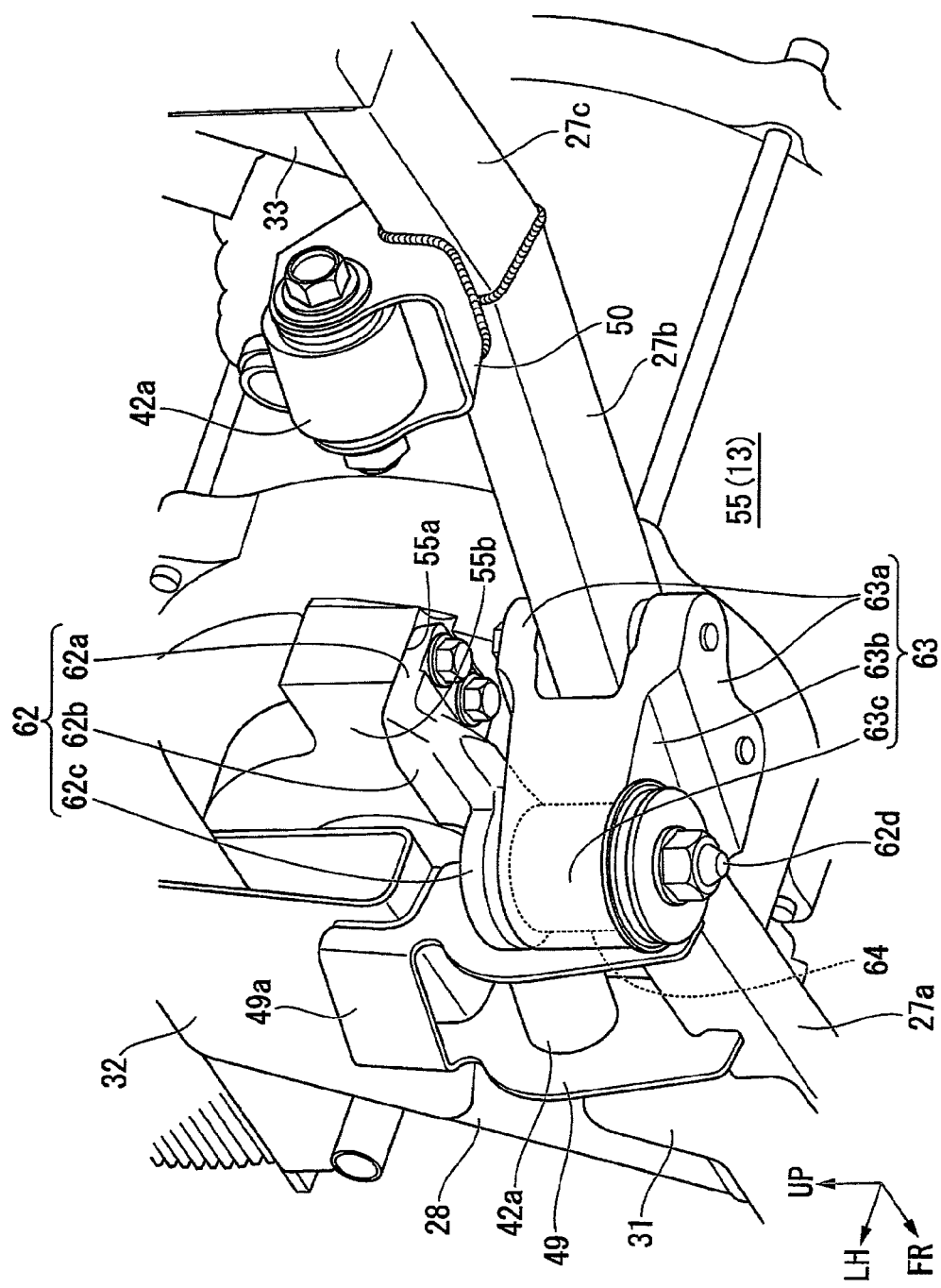
FIG. 9 is a perspective view with a periphery of a motor support bracket viewed from a rear side of bottom left.

As illustrated in FIGS. 5 and 9, the motor support bracket 61 has a motor-side bracket 62 fastened to a downward surface 55a formed to have a difference in level and formed with respect to a left side end 55b of the housing 55, a frame-side bracket 63 fastened to the intermediate portion 27c so as to sandwich from the upper and lower sides the intermediate portion 27c of the left lower side frame 27 of the sub-frame 26, and a damper member 64 interposed in a coupling part between the motor-side bracket 62 and the frame-side bracket 63.

The motor-side bracket 62 has a fastened portion 62a fastened to the downward surface 55a by a pair of front and rear bolts vertically extending, an inclined portion 62b extending outwardly in the right-to-left direction and downwardly from a left end of the fastened portion 62a, and a damper support portion 62c extending outward in the right-to-left direction from a tip end of the inclined portion 62b.

The frame-side bracket 63 has a fastened portion 63a vertically branched to sandwich the left lower side frame 27 and also fastened to the left lower side frame 27 by a pair of front and rear bolts vertically extending, an extended portion 63b extended outwardly in the right-to-left direction of the fastened portion 63a, and a cylindrical body portion 63c arranged along the vertical direction at the tip end of the extended portion 63b.

The cylindrical damper member 64 is held in the body portion 63c. An unillustrated collar and a bolt 62d as a core member extending downwardly from the center of the disc-shaped damper support portion 62c of the motor-side bracket 62 are inserted into the center of the damper member 64. Together with a washer, a nut, and the like that support a lower surface of the damper member 64, the bolt 62d holds the damper member 64 with respect to the motor-side bracket 62. In this state, a rubber bushing is formed between the motor-side bracket 62 and the frame-side bracket 63.

Figure 3:
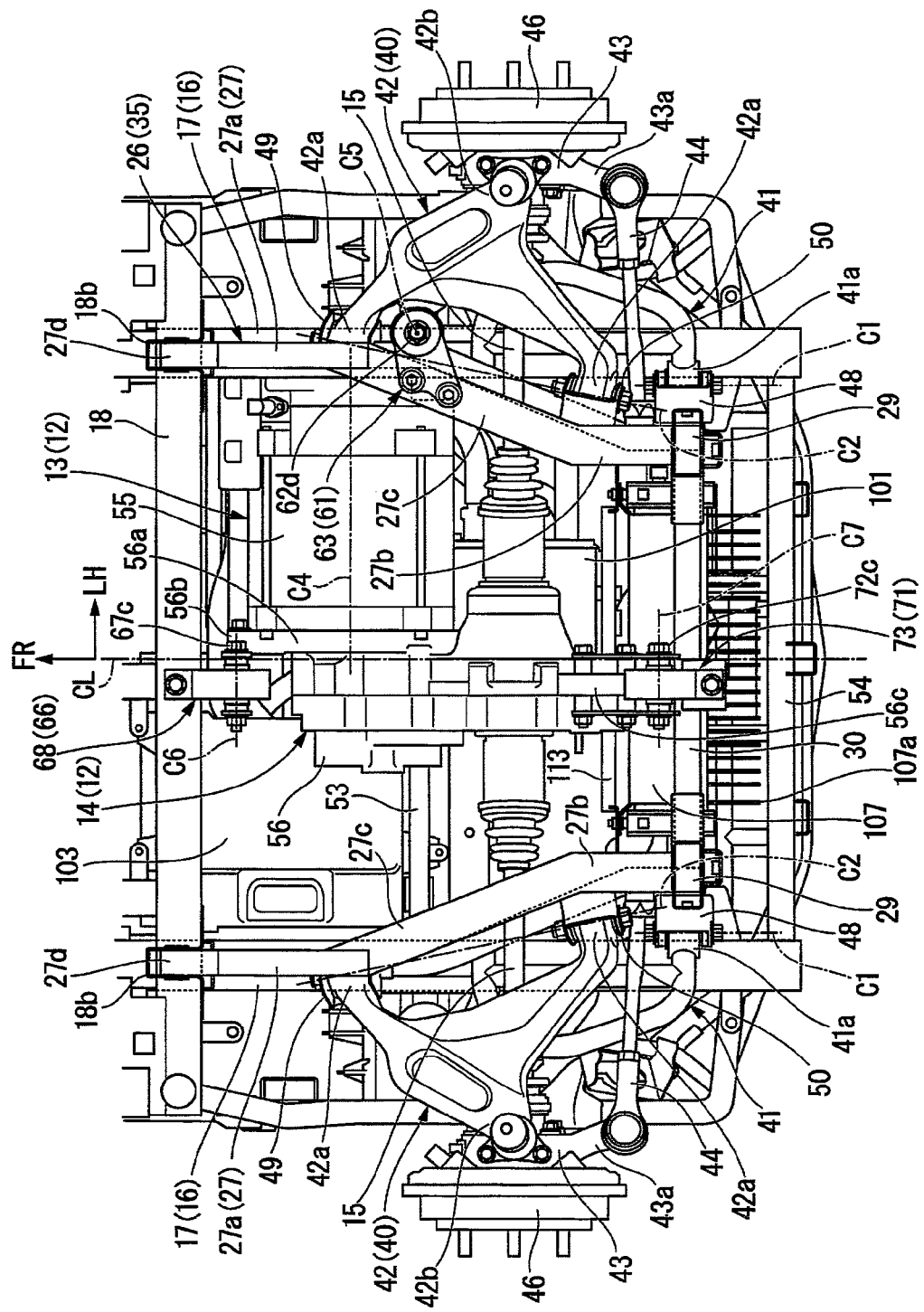
FIG. 3 is a bottom view of a periphery of a running gear of the electric vehicle.

The rubber bushing (damper member 64) is arranged outwardly in the right-to-left direction of the left lower side frame 27. With elastic deformation mainly in a horizontal direction allowed, the motor-side bracket 62 (electromotor 13) is supported with respect to the frame-side bracket 63 (left lower side frame 27) through the rubber bushing. Also, as shown in FIG. 3, the rubber bushing is arranged in a space surrounded by the base end of the lower arm 42 and the left lower side frame 27, between the front and rear base ends 42a of the lower arm 42 that has a substantially A shape. Since arrangement using a swinging space for the lower arm 42 is achieved, a dead space is effectively used.

Figure 8:
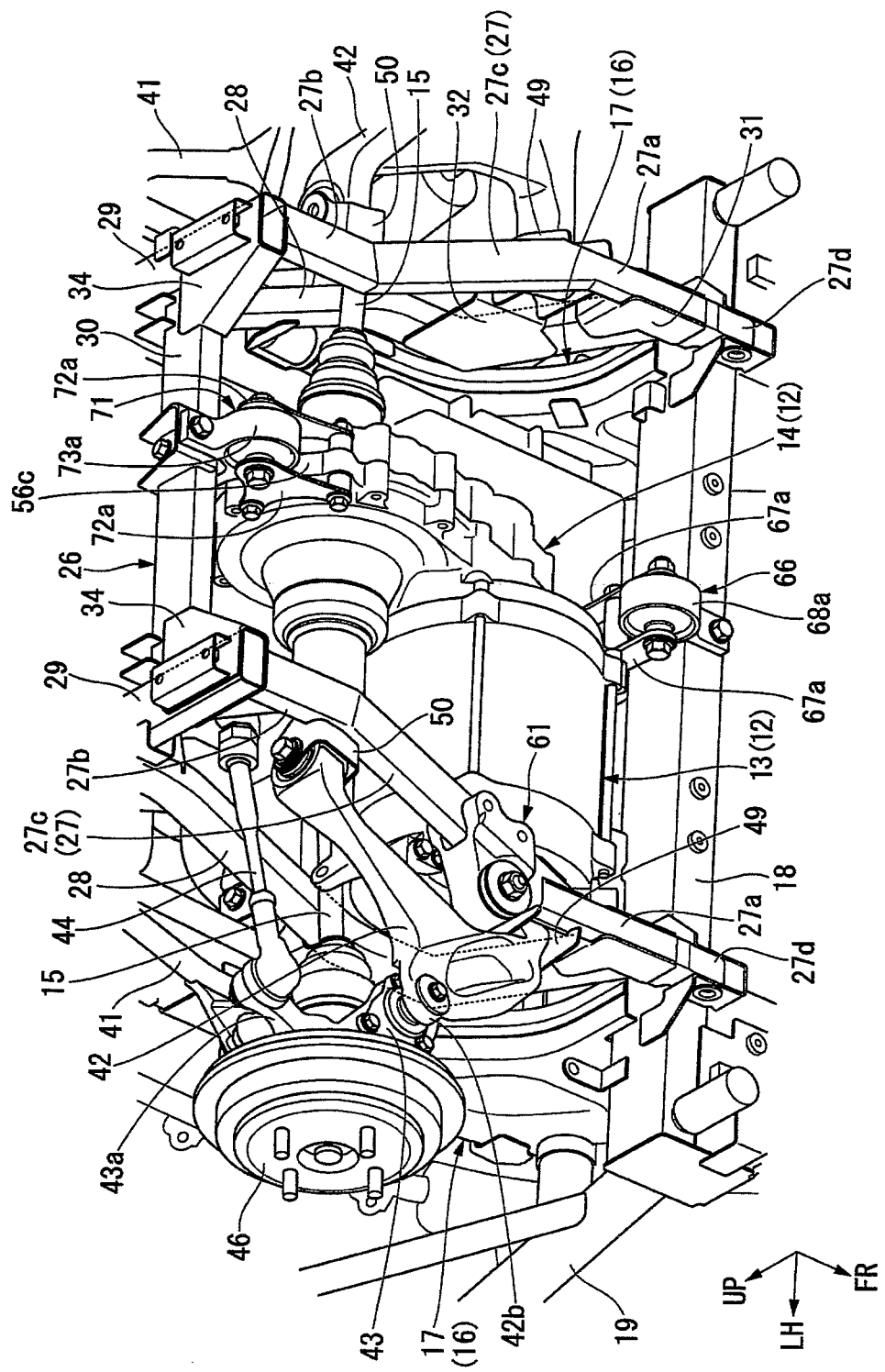
FIG. 8 is a perspective view with the periphery of the running gear viewed from a rear side of bottom left.

With reference to FIG. 5 and FIG. 8, the speed reduction gear front support bracket 66 has a speed reduction gear front bracket 67 fastened to a front lower end (front end 56b) of the motor holder 56a at intervals in the right-to-left direction and also extending downwardly of the motor holder 56a, a frame front bracket 68 fastened to the right-to-left intermediate portion of the rear lower cross frame 18 of the frame body 16, and a front damper member 69 interposed in a coupling part between the speed reduction gear front bracket 67 and the frame front bracket 68.

The speed reduction gear front bracket 67 has a pair of right and left belt-like members 67a having a plate-like shape substantially perpendicular to the right-to-left direction, formed into a belt-like shape extending in the vertical direction, and having upper portions fastened to the front lower end of the motor holder 56a. The front lower end of the motor holder 56a and the body portion 68a of the frame front bracket 68 fixed to the rear cross frame are vertically separated from each other while lapping positions thereof in the longitudinal direction, and the right and left belt-like members 67a are provided to be laid therebetween.

The frame front bracket 68 has a cylindrical body portion 68a arranged along the right-to-left direction between the lower ends of the right and left belt-like members 67a, a rear fastened portion 68b extending upwardly of the body portion 68a and fastened to the rear surface of the rear lower cross frame 18 by bolts or the like extending in the longitudinal direction, and a lower fastened portion 68c extending forward of the body portion 68a and fastened to the lower surface of the rear lower cross frame 18 by bolts or the like extending in the vertical direction.

In the body portion 68a, the cylindrical front damper member 69 is held so as to be brought into alignment with the body portion 68a. An unillustrated collar and a bolt 67d as the core member is laid between the lower ends of the right and left belt-like members 67a and are inserted into the center portion of the front damper member 69. Together with a washer, a nut, and the like, the bolt 67d holds the front damper member 69 with respect to the speed reduction gear front bracket 67. In this state, a rubber bushing is formed between the speed reduction gear front bracket 67 and the frame front bracket 68.

The rubber bushing (front damper member 69) is arranged rearwardly of the rear lower cross frame 18 in a front downward direction of the electromotor 13 (the inner side of the running gear support frame 35). With the elastic displacement mainly in the vertical direction and the longitudinal direction allowed, the speed reduction gear front bracket 67 (speed reduction gear 14) is supported with respect to the frame front bracket 68 (rear lower cross frame 18) through the rubber bushing.

The speed reduction gear support bracket 71 has a speed reduction gear rear bracket 72 fastened to the rear lower end (rear end 56c) of the casing 56 at intervals in the right-to-left direction and extending rearwardly of the casing 56, a frame rear bracket 73 fastened to the right-to-left intermediate portion of the rear end cross frame 30 of the sub-frame 26, and a rear damper member 74 interposed in a coupling part between the speed reduction gear rear bracket 72 and the frame rear bracket 73.

The speed reduction gear rear bracket 72 has a pair of right and left plate-like members 72a that are formed into a plate-like shape substantially perpendicular to the right-to-left direction, that have a triangular shape in the side view, and that have two front upper and lower portions fastened to the rear lower end of the casing 56. The rear lower end of the casing 56 and the body portion 73a of the frame rear bracket 73 fixed to the rear end cross frame 30 are separated from each other in the longitudinal direction, and the right and left plate-like members 72a are provided in such a manner so as to be laid between the rear lower end of the casing 56 and the body portion 73a.

The frame rear bracket 73 has the cylindrical body portion 73a arranged along the right-to-left direction between the rear ends of the right and left plate-like members 72a, a front fastened portion 73b extending upwardly of the body portion 73a and fastened to the front surface of the rear end cross frame 30 by a bolt or the like extending in the longitudinal direction, and a lower fastened portion 73c extending rearward of the body portion 73a and fastened to the lower surface of the rear end cross frame 30 by a bolt or the like extending in the vertical direction.

The cylindrical rear damper member 74 is held in the body portion 73a so as to be brought into alignment with the body portion 73a. An unillustrated collar and a bolt 72d as the core member is laid between the rear ends of the right and left plate-like members 72a and are inserted into the center portion of the rear damper member 74. Together with a washer, a nut and the like, the bolt 72d holds the rear damper member 74 with respect to the speed reduction gear rear bracket 72. In this state, a rubber bushing is formed between the speed reduction gear rear bracket 72 and the frame rear bracket 73.

The rubber bushing (rear damper member 74) is arranged behind the speed reduction gear 14 and forward of the rear end cross frame 30 (the inner side of the running gear support frame 35). With the elastic displacement mainly in the vertical direction and the longitudinal direction allowed, the speed reduction gear rear bracket 72 (speed reduction gear 14) is supported with respect to the frame rear bracket 73 (rear end cross frame 30) through the rubber bushing.

The center axes (the center axes of the respective bolts 67d, 72d (core members), and the damper axes) C6, C7 of the respective damper members 69, 74 of the speed reduction gear front support bracket 66 and the speed reduction gear rear support bracket 71 are arranged perpendicular to the center axis (the center axis of the bolt 62d (core member), and the damper axis) C5 of the damper member 64 of the motor support bracket 61.

In assembling the electric vehicle 1, first a subassembly is formed by preliminarily assembling the running gear 12, the upper arms 41 and the lower arms 42 to the sub-frame 26 in a subline when the running gear 12 and the rear suspensions 40 are assembled to the vehicle body frame 10.

Next, the subassembly is mounted on the frame body 16 in a main line, the frame front bracket 68 of the speed reduction gear front support bracket 66 is fixed to the rear lower cross frame 18 of the frame body 16, and also the shock absorber units 45 laid between the frame body 16 and the subassembly are mounted. Thereby, assembling of the vehicle body frame 10 with the frame body 16 and the sub-frame 26 coupled to each other is completed, and also assembling of the running gear 12 and the rear suspensions 40 to the vehicle body frame 10 is completed.

Together with the rear lower cross frame 18 of the frame body 16, the sub-frame 26 forms the running gear support frame 35 for supporting the running gear 12.

Figure 10:
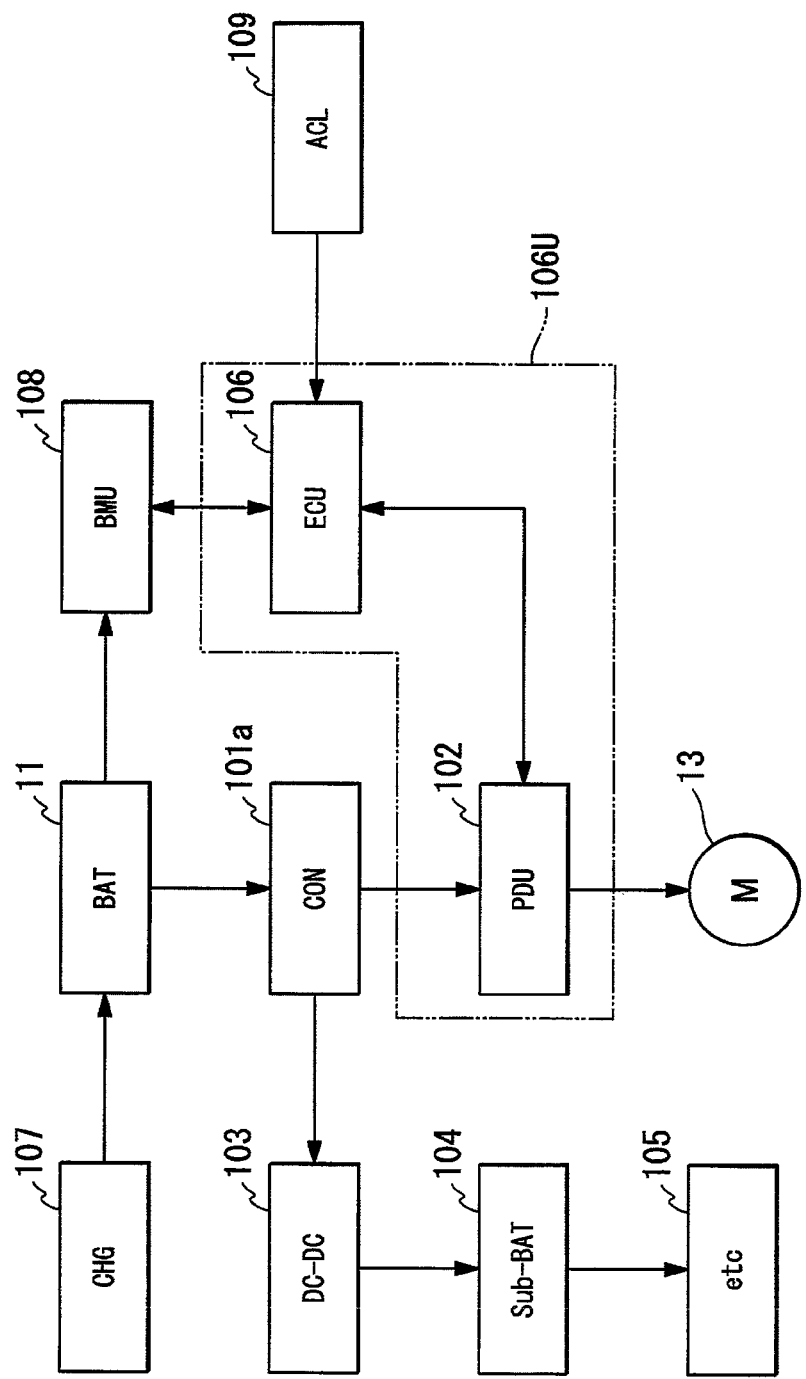
FIG. 10 is a configuration diagram of substantial parts of the electric vehicle.

As shown in FIG. 10, power from the main battery 11 is supplied to PDU (Power Driver Unit) 102 as a motor driver through a junction box 101 (see FIG. 4) including a contactor 101a interlocked with an unillustrated main switch, is converted from DC into three-phase AC by the PDU 102, and is subsequently supplied to the electromotor 13 as a three-phase AC motor. Voltage output from the main battery 11 is stepped down through a DC-DC converter (simply called a converter hereinafter), and is supplied to a 12-V sub battery 104, a general electrical component 105 such as a lamp, and a control system component such as ECU (Electric Control Unit) 106. The junction box 101 is used to appropriately branch high-voltage wiring from the main battery 11, and has a fuse provided to each branched wiring in addition to the contactor 101a.

The main battery 11 is charged by, for example, a charger 107 connected to an AC 100-V power supply. A charge/discharge state, temperature, and the like of the main battery 11 are monitored by BMU (Battery Managing Unit), and information thereon is shared with the ECU 106. Information on output requirement from an accelerator sensor 109 is input into the ECU 106. Based on the information on the output requirement, the ECU 106 drives and controls the electromotor 13 through the PDU 102. The PDU 102 and the ECU 106 are formed as an integrated control unit 106U.

The main battery 11 is formed of a plurality of unit batteries juxtaposed, for example, in the longitudinal direction and the right-to-left direction. A predetermined high voltage (48-72V) is generated by connecting the unit batteries in series. Each of the unit batteries is used for energy storage in order to be appropriately charged and/or discharged, and is formed of, for example, lithium-ion batteries, nickel hydride batteries, lead batteries or the like. The whole output cable of the main battery 11 is connected to the PDU 102 through the junction box 101, and a feeder cable extending from the PDU 102 is connected to a terminal of the electromotor 13. The PDU 102 is provide with a bridge circuit using a plurality of switching elements such as a transistor and an inverter 102a (see FIG. 4) provided with a smoothing capacitor or the like, and controls power distribution of the electromotor 13 to a stator wiring. The electromotor 13 is operated according to control by the PDU 102 to impel the electric vehicle.

Figure 6:
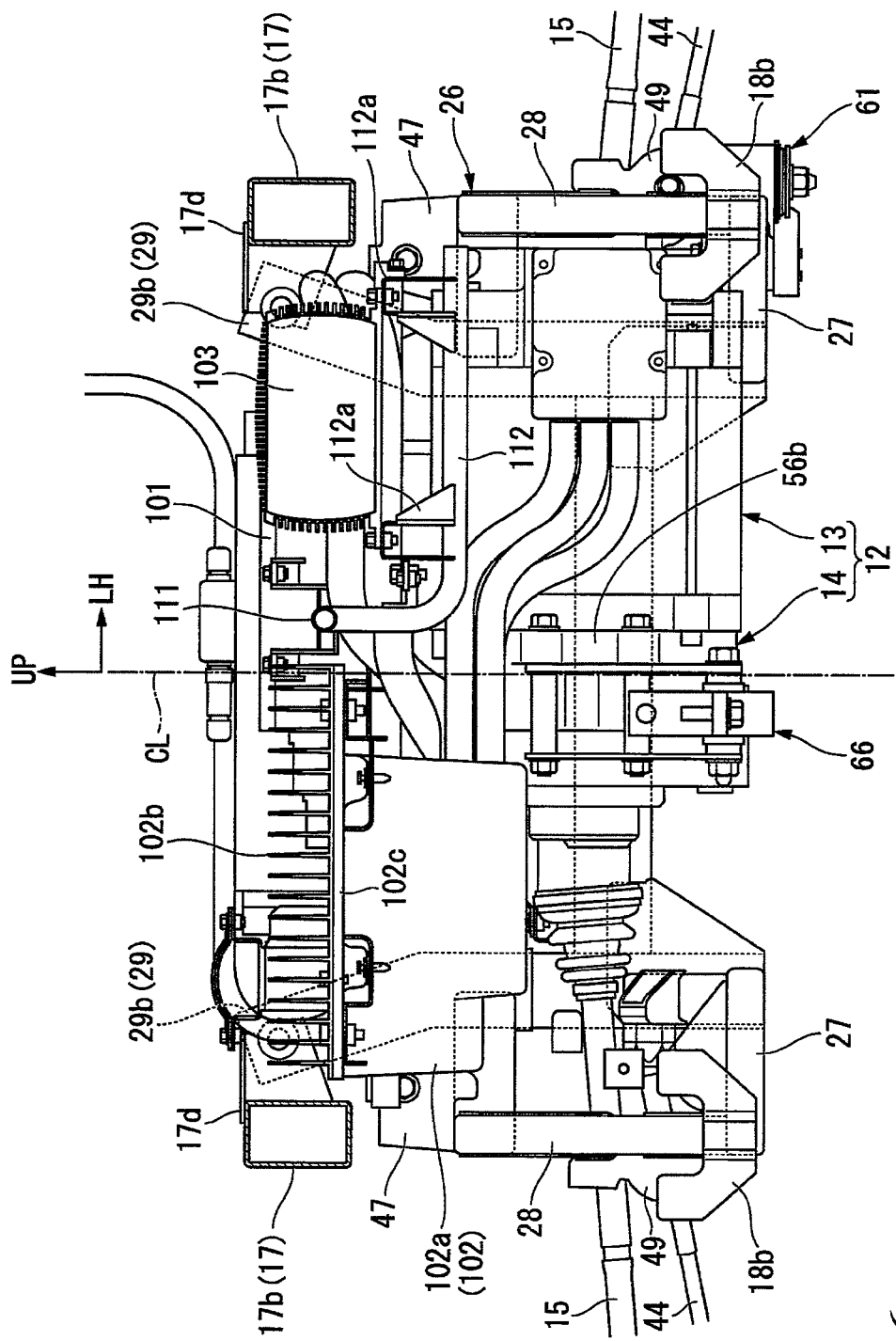
FIG. 6 is a front view of the periphery of the running gear.
Figure 7:
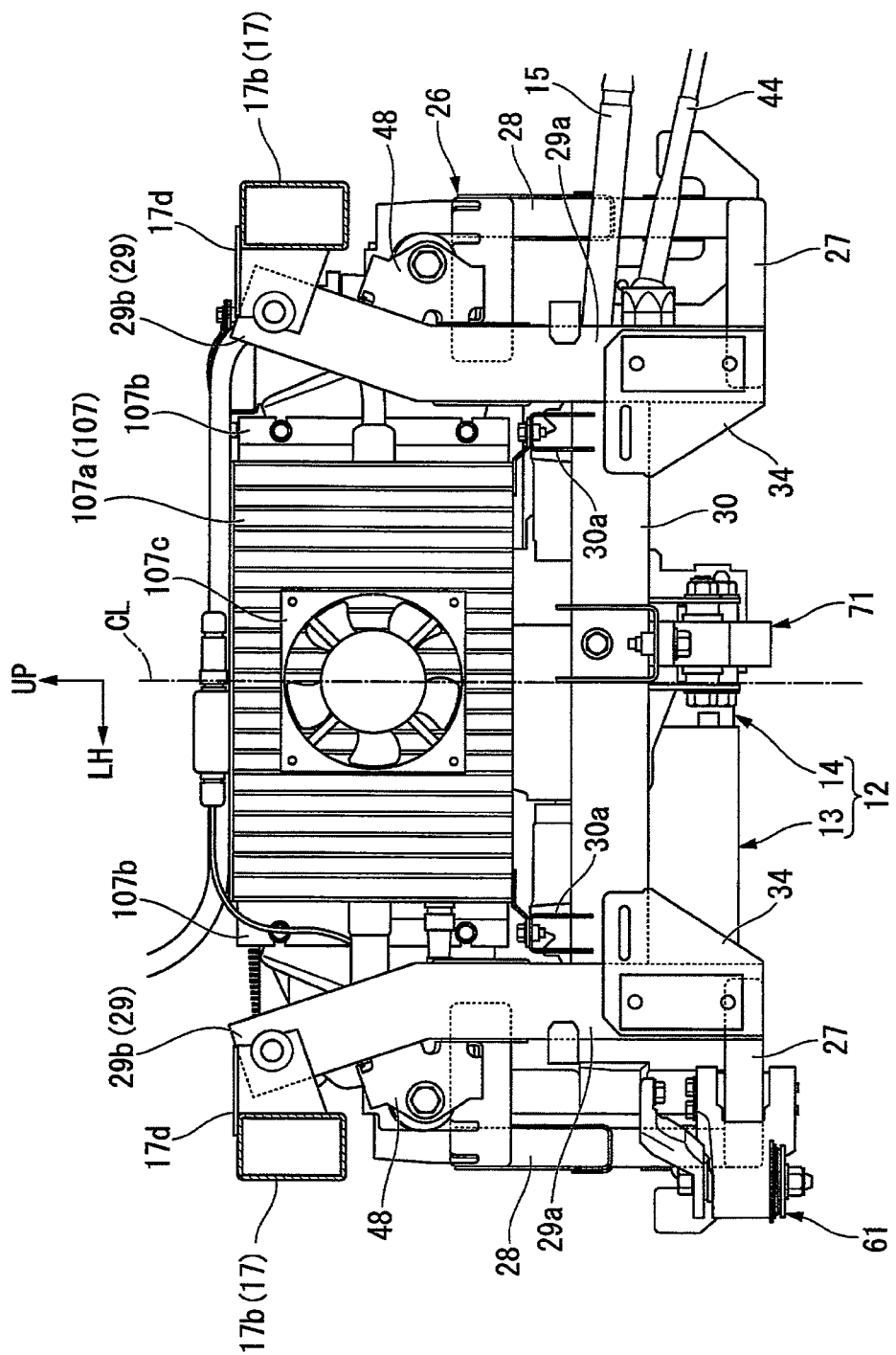
FIG. 7 is a rear view of the periphery of the running gear.

As shown in FIGS. 4, 6 and 7, the PDU 102 (inverter 102a), the converter 103, the junction box 101 and the charger 107 as the electrical components related to the running gear 12 are basically arranged above the running gear 12, between the right and left side frames 17, and between the right and left upper side frames 28.

When viewed from above, the PDU 102 is arranged on a right side between the stepped portions 17c of the right and left side frames 17. The PDU 102 is supported in such a manner so as to be suspended below a comparatively large-size heat sink 102b arranged substantially horizontally above the box-shaped body portion. The heat sink 102b is supported on the vehicle body frame 10 in such a manner that a front end flange 102c of the heat sink 102b is placed on a pair of right and left support brackets (not shown) projecting rearwardly from the rear upper cross frame 20 and is bolted. In addition, a rear end flange 102d of the heat sink 102b is placed on a pair of right and left support brackets (not shown) on the rear upper center cross frame 53 and is bolted.

The converter 103 is arranged on the left side of the PDU 102 when viewed from above, that is, on the left side between the right and left stepped portions 17c. The converter 103 is supported on the vehicle body frame 10 in such a manner that lower flanges 103a on both sides of the box-shaped body are placed on a pair of right and left converter support brackets 112a on a side of the frame body 16 and are bolted.

A first support member 111 extending in the longitudinal direction in a position closer to the right side than the right-to-left centerline CL of the vehicle body is laid between the rear upper cross frame 20 and the rear upper center cross frame 53. A second support member 112 extends downwardly from a front lower side of the first support member 111, and is subsequently curved and extends to the right. A tip end of the second support member 112 is joined to the right side frame 17. A pair of right and left converter support brackets 112a is fixed to a right extended portion of the second support member 112.

When viewed from above, the junction box 101 is positioned behind the PDU 102 and the converter 103. More specifically, positioned between the front portions of the right and left rear portions 17b, and is arranged to be displaced to the right while striding over the right-to-left centerline CL of the vehicle body in the right-to-left direction. The junction box 101 has a pair of right and left front fastened portions 101c provided on the front side of the box-shaped body and a pair of right and left rear fastened portion 101d provided on a rear side of the box-shaped body. The junction box 101 is supported on the vehicle body frame 10 in such a manner that the front fastened portions 101c are placed on the rear upper center cross frame 53 and are respectively bolted. The rear fastened portions 101d are placed on a third support member 113 on a side of the frame body 16 and are respectively bolted.

In addition, rear support brackets 113a are respectively fixed in a raised manner to the rear portions of the right and left upper side frames 28, and the third support member 113 extending in the right-to-left direction is laid between the lower portions of the right and left rear support brackets 113a.

When viewed from above, the charger 107 is arranged in such a manner so as to be positioned behind the junction box 101, that is, between the rear portions of the right and left rear portions 17b, and to stride over the right-to-left centerline CL of the vehicle body evenly in the right-to-left direction. With the box-shaped body raised, the charger 107 is arranged while a heat sink 107a faces a rear surface of the charger 107. Front end flanges 107b on both sides of the charger 107 respectively abut from behind on the respective right and left rear support brackets 113a and are bolted. Both the lower ends of the charger 107 are placed on a pair of right and left charger support brackets 30a fixed to both sides of the rear end cross frame 30 and are bolted. With this arrangement, the charger 107 is supported on the vehicle body frame 10. In FIG. 7 is indicative of a cooling fan 107c is mounted to the heat sink 107a.

As has been described above, the electric vehicle 1 in the embodiment includes the pair of right and left rear wheels RW as the drive wheels driven by the electromotor 13, the running gear 12 including the electromotor 13 and the speed reduction gear 14, and the running gear support frame 35 arranged to surround the running gear 12. The speed reduction gear 14 is configured to decelerate the power from the electromotor 13 and to also transmit the power to the pair of right and left rear wheels RW through the pair of right and left drive shafts 15, and is arranged in the right-to-left center of the vehicle body so that the pair of right and left drive shafts 15 have the same length. The electromotor 13 is configured in such a manner so that the axis direction is arranged along the vehicle right-to-left direction in order to extend the electromotor 13 on one side in the right-to-left direction of the speed reduction gear 14, and is arranged between the speed reduction gear 14 and the left lower side frame 27 as the frame member of the running gear support frame 35.

With this construction, the electromotor 13 is configured in such a manner that the axis direction is arranged along the right-to-left direction, and the electromotor 13 is arranged between the speed reduction gear 14 positioned in the right-to-left center of the vehicle body and the frame member of the running gear support frame 35. For this reason, the electromotor 13 can be surrounded and supported without forming the running gear support frame 35 into a complicated curved shape. More specifically, the frame structure can be simplified while communalizing the right and left drive shafts 15.

Also, in the electric vehicle 1, the running gear support frame 35 has the pair of right and left lower side frames 27, and the rear lower cross frame 18 and the rear end cross frame 30 which are made to serve as the front and rear cross frames. The running gear 12 is configured in such a manner that the front end 56b and the rear end 56c of the speed reduction gear 14 are respectively supported on the rear lower cross frame 18 and the rear end cross frame 30, and the side end 55b on the side of the electromotor 13 is supported on the lower side frame 27 located on the same side as the electromotor 13.

With this construction, the running gear 12 is configured in such a manner that the front end 56b and the rear end 56c of the speed reduction gear 14 positioned in the right-to-left center of the vehicle body are supported, and also the side end 55b on the side of the electromotor 13 positioned on one side in the right-to-left direction of the speed reduction gear 14 is supported. For this reason, the running gear 12 can be stably supported on the running gear support frame 35 at least at three points avoiding the same straight line.

In the electric vehicle 1, the side end 55b of the running gear 12 is supported on the lower side frame 27 through the motor support bracket 61, and the motor support bracket 61 supports the side end 55b on the outer side of the lower side frame 27.

With this construction, the motor support bracket 61 supports the side end 55b on the side of the electromotor 13 on the outer side of the lower side frame 27. For this reason, it is not necessary to provide the arrangement space for the motor support bracket 61 between the lower side frame 27 and the side end 55b. Thus, a compact layout with the electromotor 13 brought closest to the lower side frame 27 can be achieved.

Also, in the electric vehicle 1, the motor support bracket 61 includes the frame-side bracket 63 fixed to the lower side frame 27, the motor-side bracket 62 fixed to the side end 55b, and the damper member 64 arranged between the frame-side bracket 63 and the motor-side bracket 62.

With this construction, the frame-side bracket 63 and the motor-side bracket 62 are connected to each other through the damper member 64. For this reason, the side end 55b on the side of the electromotor 13 is supported on the lower side frame 27 through the damper member 64, and transmission of the vibration or the like of the running gear 12 to the running gear support frame 35 can be suppressed.

Further, in the electric vehicle 1, the frame-side bracket 63 supports the periphery of the damper member 64, and the motor-side bracket 62 supports the core member (bolt 62d) inserted into the damper member 64.

With this construction, the frame-side bracket 63 and the motor-side bracket 62 respectively support the periphery and the inner side of the damper member 64. For this reason, multidirectional vibration of the running gear 12 can be successfully damped by the damper member 64.

Still further, in the electric vehicle 1, the front end 56b of the speed reduction gear 14 is supported on the rear lower cross frame 18 through the speed reduction gear front support bracket 66, the rear end 56c of the speed reduction gear 14 is supported on the rear end cross frame 30 through the speed reduction gear rear support bracket 71, and the speed reduction gear front support bracket 66 and the speed reduction gear rear support bracket 71 respectively support the front end 56b and the rear end 56c of the speed reduction gear 14 on the inner side of the running gear support frame 35.

With this construction, the speed reduction gear front support bracket 66 and the speed reduction gear rear support bracket 71 support the front end 56b and the rear end 56c of the speed reduction gear 14 on the inner side of the running gear support frame 35. For this reason, longitudinal overhang of the running gear support frame 35 can be suppressed, and the vehicle longitudinal length can be shortened.

In the electric vehicle 1, the speed reduction gear front support bracket 66 includes the speed reduction gear front bracket 67 fixed to the front end 56b of the speed reduction gear 14, the frame front bracket 68 fixed to the rear lower cross frame 18, and the front damper member 69 arranged between the speed reduction gear front bracket 67 and the frame front bracket 68. The speed reduction gear rear support bracket 71 includes the speed reduction gear rear bracket 72 fixed to the rear end 56c of the speed reduction gear 14, the frame rear bracket 73 fixed to the rear end cross frame 30, and the rear damper member 74 arranged between the speed reduction gear rear bracket 72 and the frame rear bracket 73.

With this construction, the frame front bracket 68 and the frame rear bracket 73, and the speed reduction gear front bracket 67 and the speed reduction gear rear bracket 72, are connected to each other through the front damper member 69 and the rear damper member 74 respectively. For this reason, transmission of the vibration or the like of the running gear 12 to the running gear support frame 35 can be suppressed.

In the electric vehicle 1, the frame front bracket 68 and the frame rear bracket 73 respectively support the periphery of the front damper member 69 and the periphery of the rear damper member 74, and the speed reduction gear front bracket 67 and the speed reduction gear rear bracket 72 respectively support the core members (bolts 67d, 72d) that are inserted into the front damper member 69 and the rear damper member 74.

With this construction, the frame front bracket 68 and the frame rear bracket 73, and the speed reduction gear front bracket 67 and the speed reduction gear rear bracket 72, respectively support the peripheries and the inner sides of the front damper member 69 and the rear damper member 74. For this reason, the multidirectional vibration of the running gear 12 can be successfully damped by the front damper member 69 and the rear damper member 74.

Also, in the electric vehicle 1, the respective core members of the speed reduction gear front support bracket 66 and the speed reduction gear rear support bracket 71 and the core member of the motor support bracket 61 are arranged in such a manner that the respective axial directions are perpendicular to each other.

With this construction, the respective core members of the speed reduction gear front support bracket 66 and the speed reduction gear rear support bracket 71 and the core member of the motor support bracket 61 are arranged in such a manner that the respective axial directions are perpendicular to each other. For this reason, the multidirectional vibration of the running gear 12 can be more successfully damped.

Further, in the electric vehicle 1, the pair of right and left lower arms 42 is provided for supporting the pair of right and left drive wheels RW. The pair of right and left lower side frames 27 is provided with the front and rear arm support portions (the lower front support bracket 49 and the lower rear support bracket 50) that respectively swingably support the pair of right and left lower arms 42. The motor support bracket 61 is positioned between the front and rear arm support portions, and is arranged in the space surrounded by the lower arm 42 and the lower side frame 27.

With this construction, the motor support bracket 61 is positioned between the front and rear arm support portions, and is arranged in the space surrounded by the lower arm 42 and the lower side frame 27. For this reason, the space formed inside of the lower arm 42 can be effectively used as the arrangement space for the motor support bracket 61, and the efficient component arrangement can be achieved.

In the electric vehicle 1, the pair of right and left rear wheels RW is supported on each of the double wishbone rear suspensions 40. The pair of right and left lower side frames 27 swingably supports the pair of right and left lower arms 42 of the rear suspensions 40. The running gear support frame 35 is provided with the pair of right and left upper side frames 28 that are arranged above the pair of right and left lower side frames 27. The pair of right and left upper side frames 28 swingably supports the pair of right and left upper arms 41 of the rear suspensions 40. The electrical components (the PDU 102 (the inverter 102a), the converter 103, the junction box 101, and the charger 107) that allow the driving of the electromotor 13 are arranged between the pair of right and left upper side frames 28.

With this construction, the upper arms 41 and the lower arms 42 are respectively swingably supported on the right and left lower side frames 27 and the right and left upper side frames 28 of the running gear support frame 35, and also the running gear 12 and the electrical components are supported inside of the box-shaped running gear support frame 35. For this reason, the supporting structure for the running gear 12 and the rear suspensions 40 can be collected to the running gear support frame 35, and efficient assembly can be achieved.

Also, in the electric vehicle 1, the inverter 102a controlling the driving of the electromotor 13 is arranged on the side opposite to the electromotor 13 in the vehicle right-to-left direction.

With this construction, the efficient component arrangement can be achieved by arranging the comparatively large-size inverter 102a on the side opposite to the electromotor 13 in the vehicle right-to-left direction.

Note that the present invention is not limited to the above-described embodiment. For example, if the electric vehicle includes the pair of right and left drive wheels, the present invention may be applied not only to electric four-wheeled vehicles but also electric three-wheeled vehicles or the like. The present invention may be applied to vehicles having no upper body defining the riding space and vehicles having a saddle seat.

If the sub-frame 26 includes a cross frame instead of the rear lower cross frame 18, the running gear support frame 35 attachable/detachable to/from the frame body 16 may be formed by the sub-frame 26 only.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. An electric vehicle provided with a pair of right and left drive wheels driven by an electromotor, the electric vehicle comprising:
   a running gear including the electromotor and a speed reduction gear;
   a running gear support frame provided to surround the running gear, said running gear support frame having a pair of right and left side frames, and front and rear cross frames;
   the running gear is configured wherein a front end and a rear end of the speed reduction gear are respectively supported on the front and rear cross frames, and a side end on a side of the electromotor is supported on the side frame located on the same side as the electromotor;
   wherein the side end is supported on the side frame through a motor support bracket;
   the motor support bracket supports the side end on an outer side of the side frame;
   wherein a pair of right and left suspension arms is provided for supporting the pair of right and left drive wheels;

the pair of right and left side frames is provided with front and rear arm support portions that respectively swingably support the pair of right and left suspension arms;

the motor support bracket is positioned between the front and rear arm support portions, and is arranged in a space surrounded by the suspension arm and the side frame;

wherein the speed reduction gear is configured to decelerate power from the electromotor and to transmit the power to the pair of right and left drive wheels through a pair of right and left drive shafts, and is arranged in the right-to-left center of a vehicle body in order to make the pair of right and left drive shafts have the same length; and the electromotor includes an axis direction arranged along a vehicle right-to-left direction for extending the electromotor on one side in a right-to-left direction of the speed reduction gear, said electromotor being arranged between the speed reduction gear and frame members of the running gear support frame.

2. The electric vehicle according to claim 1, wherein the motor support bracket includes a frame-side bracket fixed to the side frame, a motor-side bracket fixed to the side end and a damper member arranged between the frame-side bracket and the motor-side bracket.

3. The electric vehicle according to claim 2,
wherein the damper member is cylindrical, and wherein the frame-side bracket supports a periphery of a the damper member; and the motor-side bracket supports a core member inserted into an inner side of the damper member.

4. The electric vehicle according to claim 1,
wherein the front end of the speed reduction gear is supported on the front cross frame through a speed reduction gear front support bracket;

the rear end of the speed reduction gear is supported on the rear cross frame through a speed reduction gear rear support bracket; and the speed reduction gear front support bracket and the speed reduction gear rear support bracket respectively support the front end and the rear end of the speed reduction gear on an inner side of the running gear support frame.

5. The electric vehicle according to claim 4,
wherein the speed reduction gear front support bracket includes a speed reduction gear front bracket fixed to the front end of the speed reduction gear, a frame front bracket fixed to the front cross frame, and a front damper member arranged between the speed reduction gear front bracket and the frame front bracket; and the speed reduction gear rear support bracket includes a speed reduction gear rear bracket fixed to the rear end of the speed reduction gear, a frame rear bracket fixed to the rear cross frame, and a rear damper member arranged between the speed reduction gear rear bracket and the frame rear bracket.

6. The electric vehicle according to claim 5,
wherein the front and rear damper members are cylindrical, and wherein the frame front bracket and the frame rear bracket respectively support a periphery of the front damper member and a periphery of the rear damper member; and the speed reduction gear front bracket and the speed reduction gear rear bracket respectively support core members that are inserted into an inner side of the front damper member and an inner side of the rear damper member.

7. The electric vehicle according to claim 6,
wherein the side end of the running gear is supported on the side frame through the motor support bracket;

the motor support bracket includes a frame-side bracket fixed to the side frame, a motor-side bracket fixed to the side end, and a side damper member arranged between the frame-side bracket and the motor-side bracket;

wherein the side damper member is cylindrical, and the frame-side bracket supports a periphery of the side damper member;

the motor-side bracket supports a core member inserted into an inner side of the side damper member; and the respective core members of the speed reduction gear front support bracket and the speed reduction gear rear support bracket and the core member of the motor support bracket are arranged wherein respective axial directions are perpendicular to each other.

8. The electric vehicle according to claim 1,
wherein the pair of right and left drive wheels is supported by double wishbone suspensions;

the pair of right and left side frames swingably supports the pair of right and left suspension arms of the suspensions;

the running gear support frame is provided with a pair of right and left upper side frames arranged above the pair of right and left side frames;

the pair of right and left upper side frames swingably supports a pair of right and left upper arms of the suspensions; and an electrical component that allows driving of the electromotor is arranged between the pair of right and left upper side frames.

9. The electric vehicle according to claim 1, wherein an inverter controlling the driving of the electromotor is arranged on a side opposite to the electromotor in the vehicle right-to-left direction.

10. An electric vehicle comprising:
an electromotor;
a pair of right and left drive wheels individually operatively connected to a pair of drive shafts driven by the electromotor;
a running gear including the electromotor and a speed reduction gear operatively connected to the electromotor;
a running gear support frame for surrounding the running gear, said running gear support frame having a pair of right and left side frames, and front and rear cross frames;
the running gear is configured wherein a front end and a rear end of the speed reduction gear are respectively supported on the front and rear cross frames, and a side end on a side of the electromotor is supported on the side frame located on the same side as the electromotor;
wherein the side end is supported on the side frame through a motor support bracket;
the motor support bracket supports the side end on an outer side of the side frame;
wherein a pair of right and left suspension arms is provided for supporting the pair of right and left drive wheels;
the pair of right and left side frames is provided with front and rear aim support portions that respectively swingably support the pair of right and left suspension arms; and
the motor support bracket is positioned between the front and rear arm support portions, and is arranged in a space surrounded by the suspension arm and the side frame;

said speed reduction gear being configured to decelerate power from the electromotor and to transmit the power to the pair of right and left drive wheels through the pair of right and left drive shafts, said speed reduction gear being arranged in the right-to-left center of a vehicle body wherein the pair of right and left drive shafts have the same length; and the electromotor includes an axis direction arranged along a vehicle right-to-left direction for extending the electromotor on one side in a right-to-left direction of the speed reduction gear, said electromotor being arranged between the speed reduction gear and frame members of the running gear support frame.

11. The electric vehicle according to claim 10, wherein the motor support bracket includes a frame-side bracket fixed to the side frame, a motor-side bracket fixed to the side end and a damper member arranged between the frame-side bracket and the motor-side bracket.

12. The electric vehicle according to claim 11,
wherein the damper member is cylindrical, and wherein the frame-side bracket supports a periphery of the damper member; and
the motor-side bracket supports a core member inserted into an inner side of the damper member.

13. The electric vehicle according to claim 10,
wherein the front end of the speed reduction gear is supported on the front cross frame through a speed reduction gear front support bracket;
the rear end of the speed reduction gear is supported on the rear cross frame through a speed reduction gear rear support bracket; and
the speed reduction gear front support bracket and the speed reduction gear rear support bracket respectively support the front end and the rear end of the speed reduction gear on an inner side of the running gear support frame.

* * * * *